US012655258B2

(12) United States Patent
Louis et al.

(10) Patent No.: US 12,655,258 B2
(45) Date of Patent: Jun. 16, 2026

(54) BONDING FILMS

(71) Applicants: SYENSQO SPECIALTY POLYMERS USA, LLC, Alpharetta, GA (US); Cytec Industries Inc., Princeton, NJ (US)

(72) Inventors: Chantal Louis, Alpharetta, GA (US); James Francis Pratte, Wilmington, DE (US); Mohammad Jamal El-Hibri, Atlanta, GA (US)

(73) Assignees: Syensqo Specialty Polymers USA, LLC, Alpharetta, GA (US); Cytec Industries Inc., Princeton, NJ (US)

( * ) Notice: Subject to any disclaimer, the term of this patent is extended or adjusted under 35 U.S.C. 154(b) by 251 days.

(21) Appl. No.: 18/261,229

(22) PCT Filed: Jan. 10, 2022

(86) PCT No.: PCT/EP2022/050342

§ 371 (c)(1),
(2) Date: Jul. 12, 2023

(87) PCT Pub. No.: WO2022/152653

PCT Pub. Date: Jul. 21, 2022

(65) Prior Publication Data

US 2024/0317950 A1 Sep. 26, 2024

Related U.S. Application Data

(60) Provisional application No. 63/136,227, filed on Jan. 12, 2021.

(30) Foreign Application Priority Data

Apr. 23, 2021 (EP) .................................... 21170100

(51) Int. Cl.

| | |
|---|---|
| ***C08J 5/18*** | (2006.01) |
| ***B32B 5/02*** | (2006.01) |
| ***B32B 7/12*** | (2006.01) |
| ***B32B 27/08*** | (2006.01) |
| ***B32B 27/12*** | (2006.01) |
| ***B32B 27/28*** | (2006.01) |
| ***C08J 5/12*** | (2006.01) |
| ***C09J 5/06*** | (2006.01) |
| ***C09J 171/00*** | (2006.01) |

(52) U.S. Cl.

CPC .................. *C08J 5/18* (2013.01); *B32B 5/02* (2013.01); *B32B 7/12* (2013.01); *B32B 27/08* (2013.01); *B32B 27/12* (2013.01); *B32B 27/285* (2013.01); *B32B 27/288* (2013.01); *C08J 5/121* (2013.01); *C09J 5/06* (2013.01); *C09J 171/00* (2013.01); *B32B 2250/24* (2013.01); *B32B 2250/40* (2013.01); *B32B 2260/023* (2013.01); *B32B 2260/046* (2013.01); *B32B 2262/101* (2013.01); *B32B 2262/106* (2013.01); *B32B 2270/00* (2013.01); *B32B 2307/30* (2013.01); *B32B 2605/18* (2013.01); *C08J 2371/10* (2013.01); *C08J 2471/10* (2013.01); *C09J 2471/00* (2013.01)

(58) Field of Classification Search

CPC .......... C08J 5/18; C08J 5/121; C08J 2371/10; C08J 2471/10; C08J 2471/00; C08J 2371/00; B32B 5/02; B32B 7/12; B32B 27/08; B32B 27/12; B32B 27/285; B32B 27/288; B32B 2250/24; B32B 2250/40; B32B 2260/023; B32B 2260/046; B32B 2262/101; B32B 2262/106; B32B 2270/00; B32B 2307/30; B32B 2605/18; B32B 2250/05; B32B 2307/718; B32B 5/12; B32B 5/26; C09J 5/06; C09J 171/00; C09J 2471/00; C09J 2400/226; C08G 2650/40; C08G 65/4012

See application file for complete search history.

(56) References Cited

U.S. PATENT DOCUMENTS

| | | | | |
|---|---|---|---|---|
| 5,250,738 | A | 10/1993 | Hackenbruch et al. | |
| 5,300,693 | A | 4/1994 | Gilb et al. | |
| 11,851,541 | B2 * | 12/2023 | Louis | C08G 8/02 |
| 12,018,124 | B2 * | 6/2024 | Louis | C08J 3/12 |
| 12,247,101 | B2 * | 3/2025 | Louis | C08G 65/46 |
| 2012/0160829 | A1 | 6/2012 | Dufaure et al. | |

FOREIGN PATENT DOCUMENTS

| | | | |
|---|---|---|---|
| JP | H01201332 | A * | 8/1989 |
| JP | H01221426 | A * | 9/1989 |
| WO | 2011001103 | A2 | 1/2011 |
| WO | 2015198063 | A1 | 12/2015 |
| WO | 2020254097 | A1 | 12/2020 |
| WO | 2020254101 | A1 | 12/2020 |
| WO | 2021008983 | A1 | 1/2021 |

* cited by examiner

*Primary Examiner* — John D Freeman

(74) *Attorney, Agent, or Firm* — Osha Bergman Watanabe & Burton LLP

(57) ABSTRACT

Bonding films comprising PEEK-PEoEK copolymers are compatible with polyaryletherketone chemistry thereby providing joined polyaryletherketone polymer parts with high fracture toughness and overall good mechanical properties.

15 Claims, No Drawings

BONDING FILMS

RELATED APPLICATIONS

This application is a national stage entry of PCT/EP2022/050342, filed on Jan. 10, 2022, which claims priority of provisional application No. 63/136,227 filed on 12 Jan. 2021 in the United States and of patent application EP number 21170100.8 filed on 23 Apr. 2021 in Europe, the whole content of each of these applications being incorporated herein by reference for all purposes.

TECHNICAL FIELD

The invention relates to the use of PEEK-PEoEK copolymers for the manufacture of bonding films and their use in assemblies such as composites, laminates or the like.

BACKGROUND ART

Within many industries, in particular the aerospace industry, considerable use is made of laminates, composites and other assemblies comprising multiple layers of different materials, each material contributing specific properties to the final assembly. It has often proven to be challenging to achieve satisfactory adhesion or bonding directly between the dissimilar layers that may need to be utilized in a composite or laminate. Poor compatibility between composite layers can limit the properties exhibited by such assemblies. In particular, certain thermoplastic polymers (particularly crystalline and/or high temperature thermoplastics) exhibit poor adhesion to other materials, leading to problems with delamination and loss of structural integrity when the assembly is placed in use in a highly demanding environment.

A number of techniques have been proposed to secure and/or bond thermoplastic components together. In particular, many different welding processes, such as ultrasonic welding, induction welding and hot-plate welding, have been proposed for securing first and second thermoplastics components together. However, local melting of the first and second parts in the region of the weld may affect the integrity and/or shape of the parts. It may also lead to distortion due to residual stress build-up in the parts during the melting and/or cooling of the thermoplastic in the region of the weld.

In order to address some of the problems associated with welding processes, it has been proposed to provide a film and/or adhesive between parts and/or layers to bond them together.

WO11/001103A2 describes the use of an amorphous polyetherketoneketone (PEKK) film as a tie layer in assemblies such as composites and laminates. However, given the amorphous nature of the film, it is not deemed suitable for use in structural applications in the aerospace industry. As a general point, the use of amorphous materials as bonding layer in a composite may represent the weakest part of the structure, where properties such as solvent resistance are relatively low. Thus, the joint may be prone to attack by fluids leading to premature failure of the structure.

WO2015/198063A1 discloses the use of a polymeric material which comprises a PEEK-PEDEK polymer, that is a polymer having a repeat unit of formula O-Ph-O-Ph-CO-Ph- I and a repeat unit of formula O-Ph-Ph-O-Ph-CO-Ph- II wherein Ph represents a phenylene moiety, as an adhesive between a first part and a second part comprising polyaryletherketone polymers, in particular PEEK. The mechanical properties of PEEK-PEDEK polymers are however not as good as those of other polyaryletherketone polymers.

Hence the need still exists to provide films and/or layers capable of binding together parts made of polyaryletherketone polymers endowed with good chemical resistance and mechanical properties.

In order to decrease the processing temperature to make composites parts, it would be advantageous to use polyaryletherketone polymers having a melting temperature lower than the melting temperature of the polyaryletherketone polymers used so far. Accordingly, there is the need to have bonding films comprising a semi-crystalline polymer with a melting temperature below 310° C. to allow the proper bonding of parts based on low melting polyaryletherketone polymers.

DISCLOSURE OF THE INVENTION

It has been now found that films comprising PEEK-PEoEK copolymers, in particular those with a $(R_{PEEK})/(R_{PEoEK})$ molar ratio in the range from 90/10 to 55/45, preferably from 85/15 to 60/40, are compatible with polyaryletherketone chemistry, thereby providing joined polyaryletherketone polymer parts with high fracture toughness, and have a minimum crystallinity level of 4 J/g when measured by DSC (10° C./min cooling rate), thereby providing composite materials with outstanding mechanical performance.

A first object of the invention is thus a film comprising a PEEK-PEoEK copolymer. The film is suitable for use as a bonding film and in the remainder of the description the terms "film" and "bonding film" may be used interchangeably.

For the purposes of the present description:

- the use of parentheses before and after symbols or numbers identifying compounds, chemical formulae or parts of formulae has the mere purpose of better distinguishing those symbols or numbers from the rest of the text and hence said parentheses can also be omitted;
- when numerical ranges are indicated range ends are included;
- the expression "comprising a PEEK-PEoEK copolymer" means that one or more than one PEEK-PEoEK copolymer is comprised in the composition.

PEEK-PEoEK Copolymer

As used herein, the expression "PEEK-PEoEK copolymer" refers to a polymer which comprises at least 50 mol. %, collectively, of repeat units $(R_{PEEK})$ and repeat units $(R_{PEoEK})$, relative to the total number of moles of repeat units in the PEEK-PEoEK copolymer, in a molar ratio $(R_{PEEK})/(R_{PEoEK})$ ranging from 95/5 to 5/95. In some embodiments, the PEEK-PEoEK copolymer comprises at least 60 mol. %, at least 70 mol. %, at least 80 mol. %, at least 90 mol. %, at least 95 mol. %, and most preferably at least 99 mol. % of repeat units $(R_{PEEK})$ and $(R_{PEoEK})$, relative to the total number of moles of repeat units in the PEEK-PEoEK copolymer.

Repeat units $(R_{PEEK})$ and $(R_{PEoEK})$ are present in the PEEK-PEoEK copolymer in a molar ratio $(R_{PEEK})/(R_{PEoEK})$ ranging from 90/10 to 55/45. Yet, it is generally understood that preferred PEEK-PEoEK copolymers suitable for the film of the invention are those wherein molar ratio $(R_{PEEK})/$ ($R_{PEoEK}$) preferably ranges from 85/15 to more than 55/45, more preferably from 85/15 to 60/40, still more preferably from 80/20 to 65/35.

Repeat unit ($R_{PEEK}$) is represented by formula:

(A)

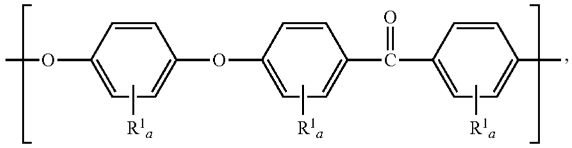

and repeat unit ($R_{PEoEK}$) is represented by formula:

(B)

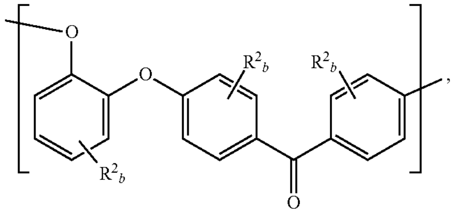

where each $R^1$ and $R^2$, equal to or different from each other, is at each occurrence independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

each a and b is independently selected from the group consisting of integers ranging from 0 to 4.

In some preferred embodiments, in formula (A) each a is zero, such that the repeat units ($R_{PEEK}$) are repeat units of formula:

(A-1)

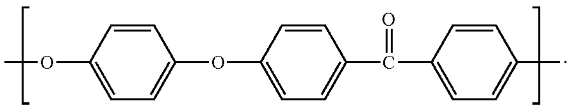

In some preferred embodiments, in formula (B) each b is zero, such that the repeat units ($R_{PEoEK}$) are repeat units of formula:

(B-1)

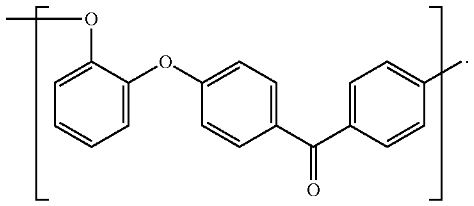

Preferably, repeat units ($R_{PEEK}$) are repeat units of formula (A-1), and repeat units ($R_{PEoEK}$) are repeat units of formula (B-1).

The PEEK-PEoEK copolymer of the present invention may additionally comprise repeat units ($R_{PAEK}$) different from repeat units ($R_{PEEK}$) and ($R_{PEoEK}$), as above detailed. In such case, the amount of repeat units ($R_{PAEK}$) can be comprised between 0.1 and less than 50 mol. %, preferably less than 10 mol. %, more preferably less than 5 mol. %, most preferably less than 2 mol. %, with respect to the total number of moles of repeat units of PEEK-PEoEK copolymer.

When repeat units ($R_{PAEK}$) different from repeat units ($R_{PEEK}$) and ($R_{PEoEK}$) are present in the PEEK-PEoEK copolymer of the present invention, these repeat units ($R_{PAEK}$) different from units ($R_{PEEK}$) and ($R_{PEoEK}$), as described above, generally comply with any of the following formulae (K-A) to (K-M) herein below:

(K-A)

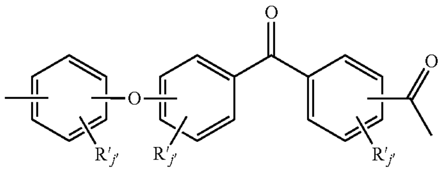

(K-B)

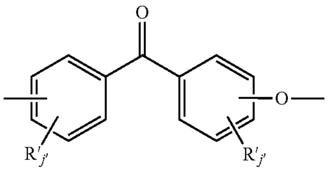

(K-C)

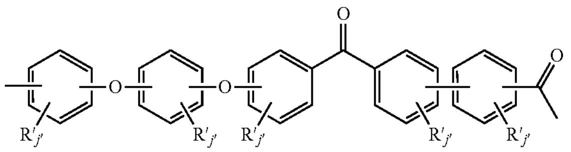

(K-D)

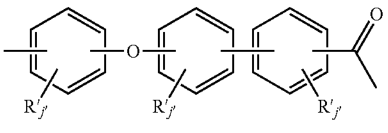

(K-E)

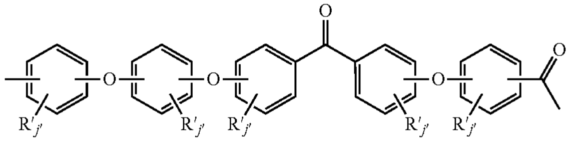

(K-F)

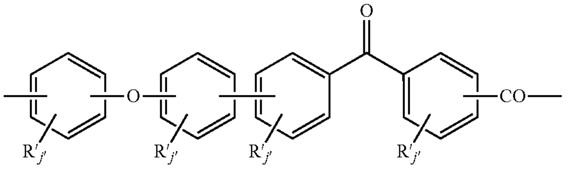

-continued (K-G)

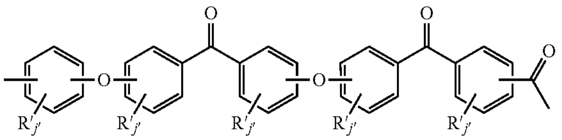

(K-H)

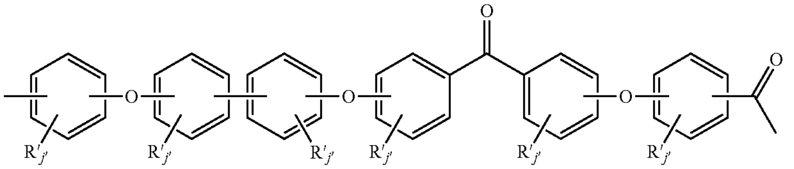

(K-I)

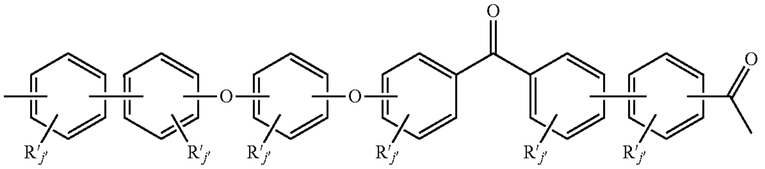

(K-J)

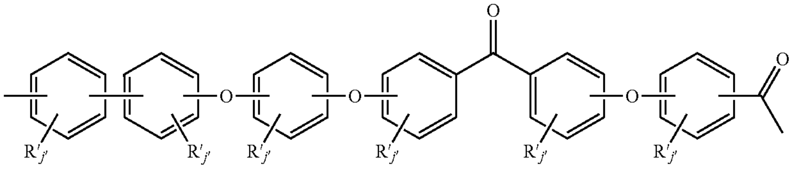

(K-K)

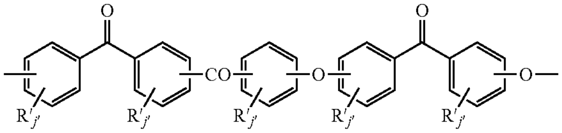

(K-L)

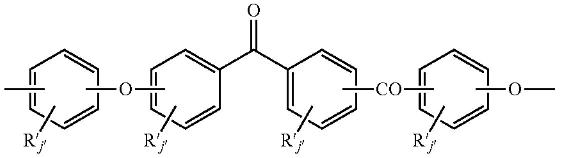

(K-M)

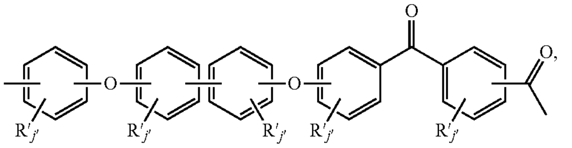

wherein in each of formulae (K-A) to (K-M) above, each of R', equal to or different from each other, is at each occurrence independently selected from a C1-C12 alkyl, alkenyl, alkynyl, or aryl group optionally comprising one or more than one heteroatoms; sulfonic acid and sulfonate groups; phosphonic acid and phosphonate groups; amine and quaternary ammonium groups; and each of j', equal to or different from each other, is independently at each occurrence selected from 0 and an integer of 1 to 4, preferably j' being equal to zero. In recurring unit ($R_{PAEK}$), the respective phenylene moieties may independently have 1,2-, 1,4- or 1,3-linkages to the other moieties different from R' in the recurring unit.

Preferably the PEEK-PEoEK copolymer used in the film of the present invention is essentially composed of repeat units ($R_{PEEK}$) and ($R_{PEoEK}$), as above detailed. Thus, in some preferred embodiments, the PEEK-PEoEK copolymer consists essentially of repeat units ($R_{PEEK}$) and ($R_{PEoEK}$). As used herein, the expression “consists essentially of repeat units ($R_{PEEK}$) and ($R_{PEoEK}$)” means that any additional repeat unit different from repeat units ($R_{PEEK}$) and ($R_{PEoEK}$), as above detailed, may be present in the PEEK-PEoEK copolymer in amount of at most 2 mol. %, at most 1 mol. % or at most 0.5 mol. %, relative to the total number of moles of repeat units in the PEEK-PEoEK copolymer, and so as not to substantially alter the advantageous properties of the PEEK-PEoEK copolymer.

Preferred PEEK-PEoEK copolymers generally possess a solubility of below 0.2% wt in N-methylpyrrolidone (NMP), N,N-dimethylacetamide (DMAc) and N,N-dimethylformamide (DMF), when determined at a temperature of 150° C. or less. In some embodiments, the PEEK-PEoEK copolymer used in connection with bonding films is advantageously substantially insoluble in the above-listed solvents, which make them particularly adapted for use in applications requiring improved chemical and/or, in some cases, fluid resistance.

In some embodiments, the PEEK-PEoEK copolymer has a melting temperature ($T_m$) of less than or equal to 320° C., preferably less than or equal to 315° C., measured by differential scanning calorimetry (DSC) according to ASTM D3418-03, E1356-03, E794-06.

Melting temperature, $T_m$, glass transition temperature, Tg, and heat of fusion ($\Delta H$) are measured by differential scanning calorimetry (DSC) according to ASTM D3418-03, E1356-03, E793-06, E794-06 standard, applying heating and cooling rates of 10° C./min, with a sweep from 30° C. to 400° C.

Advantageous bonding films were prepared with PEEK-PEoEK copolymers having a melting temperature ($T_m$) of less than or equal to 320° C., preferably of less than or equal to 310° C. and/or at least 270° C.

In some embodiments, the PEEK-PEoEK copolymer has a heat of fusion (ΔH) of at least 4 J/g, preferably at least 5 J/g, or at least 10 J/g, more preferably of at least 15 J/g. In some aspects, the PEEK-PEoEK copolymer may have a heat of fusion (ΔH) of at most 75 J/g, preferably at most 65 J/g.

In some embodiments, the PEEK-PEoEK copolymer has a glass transition temperature ($T_g$) of less than or equal to 165° C., preferably less than or equal to 160° C., less than or equal to 155° C., or less than or equal to 150° C. as measured in a differential scanning calorimeter (DSC) according to ASTM D3418-03 and E1356-03. In some embodiments, the PEEK-PEoEK copolymer has a glass transition temperature (Tg) of higher than or equal to 130° C., preferably higher than or equal to 135° C. as measured in a differential scanning calorimeter (DSC) according to ASTM D3418-03 and E1356-03.

Depending upon the requirements, the PEEK-PEoEK copolymer may be manufactured with higher or lower molecular weight, so as to tune molten copolymer viscosity in a very wide range. In some embodiments, the PEEK-PEoEK copolymer may have a melt viscosity (MV) as measured according to ASTM D3835 at 410° C., 46.3 $s^{-1}$ of at least 0.10 $KN/m^2$, more preferably at least 0.20 $kN/m^2$ and most preferably at least 0.25 $KN/m^2$. In some embodiments, the PEEK-PEoEK copolymer may have a melt viscosity (MV) as measured according to ASTM D3835 at 410° C., 46.3 $s^{-1}$ of at most 1.50 $KN/m^2$, more preferably at least 1.30 $KN/m^2$ and most preferably at least 1.10 $KN/m^2$.

The stability in the melt phase of the PEEK-PEoEK copolymer may be determined as a ratio between the melt viscosity determined after 40 minutes of dwell time at 410° C. under a shear rate of 46.3 $s^{-1}$ and the melt viscosity determined after 10 minutes of dwell time at same temperature and shear rate, wherein said melt viscosity is determined using a capillary rheometer according to ASTM D3835 standard using a conical die (diameter=1.016 mm, length=20.32 mm, cone angle=120°). The melt stability of the PEEK-PEoEK copolymer is preferably less than 1.23, preferably less than 1.22, more preferably less than 1.21. Preferably the melt stability is higher than 0.60, more preferably higher than 0.65, most preferably higher than 0.70.

FT-IR analysis of the PEEK-PEoEK copolymer can provide valuable information about microstructure of the copolymer, including the concatenation of the various monomers, characteristics of the end groups and the presence or absence of defects. According to certain preferred embodiments, the PEEK-PEoEK copolymer possesses a microstructure such that its FT-IR spectrum, when recorded between 600 and 1,000 $cm^{-1}$ in ATR mode on polymer powder, is such that the following inequalities are satisfied:

(i)

$$\frac{A_{700\ cm-1}}{A_{704\ cm-1}} \leq 0.99,$$

wherein $A_{704\ cm^{-1}}$ is the absorbance of 700 $cm^{-1}$ and $A_{704\ cm^{-1}}$ is the absorbance at 704 $cm^{-1}$;

(ii)

$$\frac{A_{816\ cm-1}}{A_{835\ cm-1}} \geq 0.61,$$

wherein $A_{816\ cm^{-1}}$ is the absorbance of 816 $cm^{-1}$ and $A_{835\ cm^{-1}}$ is the absorbance at 835 $cm^{-1}$;

(iii)

$$\frac{A_{623\ cm-1}}{A_{557\ cm-1}} \leq 1.60,$$

wherein $A_{623\ cm^{-1}}$ is the absorbance of 623 $cm^{-1}$ and $A_{557\ cm^{-1}}$ is the absorbance at 557 $cm^{-1}$;

(iv)

$$\frac{A_{928\ cm-1}}{A_{924\ cm-1}} \leq 1.09,$$

wherein $A_{928\ cm^{-1}}$ is the absorbance of 928 $cm^{-1}$ and $A_{924\ cm^{-1}}$ is the absorbance at 924 $cm^{-1}$.

PEEK-PEoEK copolymers possessing the specific microstructure (including monomers' concatenation, end groups and defects), which is characterized by the spectroscopic features above, may deliver improved chemical and mechanical performance.

The PEEK-PEoEK copolymer may be such that it has a calcium content of less than 5 ppm, as measured by Inductively Coupled Plasma Optical Emission Spectrometry (ICP-OES) calibrated with standards of known calcium content. According to these preferred embodiments, the PEEK-PEoEK copolymer may have a calcium content of less than 4 ppm, less than 3 ppm or even more preferably less than 2.5 ppm.

In these preferred embodiments, the PEEK-PEoEK copolymer may also be such that it has a sodium content of less than 1,000 ppm, as measured by Inductively Coupled Plasma Optical Emission Spectrometry (ICP-OES) calibrated with standards of known sodium content. Preferably, the PEEK-PEoEK copolymer may have a sodium content of less than 900 ppm, less than 800 ppm or even more preferably less than 500 ppm.

In some embodiments, the PEEK-PEoEK copolymer may be such that it has a phosphorus content of at least 6 ppm, as measured by Inductively Coupled Plasma Optical Emission Spectrometry (ICP-OES) calibrated with standards of known phosphorus content. Preferably, the PEEK-PEoEK copolymer has a phosphorous content of at least 10 ppm, at least 15 ppm or even more preferably at least 20 ppm.

In the bonding film of the present invention, it may be advantageous to select PEEK-PEoEK copolymers having increased thermal stability, which may be particularly beneficial when the components to be joined by the bonding film are high melting temperature polymers and/or the final part has to withstand high operating temperatures. Accordingly, in some embodiments, PEEK-PEoEK copolymers have a peak degradation temperature of at least 550° C., as measured TGA according to ASTM D3850, more preferably at least 551° C. and even more preferably at least 552° C.

Methods adapted for making PEEK-PEoEK copolymers are generally known in the art. Generally, the PEEK-PEoEK copolymer used herein is made by a method which comprises reacting at least one difluoro-compound of formula (C):

(C)

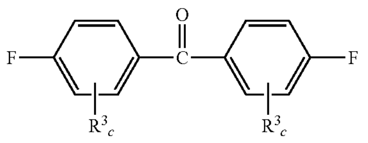

with a mixture of di-hydroxy compounds of formulas (D) and (E):

(D)

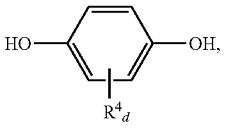

and (E)

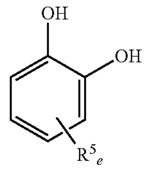

in a molar ratio (D)/(E) ranging from 90/10 to 55/45, wherein $R^3$, $R^4$, and $R^5$, have the meaning specified above, each c, d, and e is independently selected from the group consisting of integers ranging from 0 to 4, in a polar organic solvent in the presence of a base, such as, for example, $Na_2CO_3$, $K_2CO_3$, or a combination thereof. Preferably each of c, d, and e is zero.

In an embodiment, the PEEK-PEoEK copolymers used in the film of the invention are prepared as described in WO2020/254097A1, the full content of which is incorporated herein by reference in its entirety.

Film Composition and Methods of Making the Film

In some embodiments, the inventive film comprises at least one additive, other than the PEEK-PEoEK copolymer(s). Suitable additives include, but are not limited to, (i) colorants such as dyes (ii) pigments such as titanium dioxide, zinc sulfide and zinc oxide (iii) light stabilizers, e.g., UV stabilizers, (iv) heat stabilizers, (v) antioxidants such as organic phosphites and phosphonites, (vi) acid scavengers, (vii) processing aids, (viii) nucleating agents, (ix) internal lubricants and/or external lubricants, (x) flame retardants, (xi) smoke-suppressing agents, (x) anti-static agents, (xi) anti-blocking agents, (xii) conductivity additives such as carbon black and carbon nanofibrils, (xiii) plasticizers, (xiv) flow modifiers, (xv) extenders, (xvi) metal deactivators and (xvii) flow aids such as silica.

According to certain embodiments, the film of the invention further comprises at least one nucleating agent. The nucleating agent may be selected from the group consisting of boron-containing compounds (e.g., boron nitride, sodium tetraborate, potassium tetraborate, calcium tetraborate, etc.), alkaline earth metal carbonates (e.g., calcium magnesium carbonate), oxides (e.g., titanium oxide, aluminum oxide, magnesium oxide, zinc oxide, antimony trioxide, etc.), silicates (e.g., talc, sodium-aluminum silicate, calcium silicate, magnesium silicate, etc.), salts of alkaline earth metals (e.g., calcium carbonate, calcium sulfate, etc.), nitrides and so forth. The nucleating agent can also be carbon based. Nucleating agents in this category includes graphite, graphene, graphitic nanoplatelets and graphene oxide. It can also be a carbon black as well as other forms of carbon. Particularly good results have been obtained when the nucleating agent was boron nitride.

Typically, the film includes less than 20 wt. % of additives, preferably less than 10 wt. %, more preferably less than 5 wt. % and even more preferably less than 2 wt. % of additives, most preferably less than 1 wt. %.

In a preferred embodiment the film is free of any reinforcing fiber, that is it contains less than 0.5 wt. %, preferably less than 0.1 wt. % of any reinforcing fiber. The term "fiber" has its ordinary meaning as known to those skilled in the art and may include one or more fibrous materials adapted for the reinforcement of composite structures, i.e., a "reinforcing fiber". The term "fiber" is used herein to refer to fibers, organic and/or inorganic, that have a length of at least 0.5 mm.

In some embodiments, the film may comprise a blend of more than one polymers, one of which is the PEEK-PEoEK copolymer. According to these embodiments, the bonding film may comprise 40 wt. % or less (based on the total weight of polymer matrix) of at least one additional polymer component, different from the PEEK-PEoEK copolymer. Such additional polymer component is advantageously selected from the group consisting of poly(aryl ether sulfone) (PAES) polymers, and poly(aryl ether ketone) (PAEK) polymers. When the additional polymer component is a PAES polymer, it may be advantageously selected from the group consisting of a polysulfone (PSU), a polyphenylsulfone (PPSU), and a poly(ether sulfone) (PES). When the additional polymer component is a PAEK polymer, it may be advantageously selected from the group consisting of a poly(ether ether ketone) (PEEK) polymer, a poly(ether ketone ketone) (PEKK) polymer, a polyetherketone (PEK), a polyetherketoneetherketoneketone (PEKEKK), and a PEEK-PEDEK copolymer. The additional polymer component may also include a polyimide, such as polyetherimide (PEI) or polyamideimide.

In alternative embodiments, the PEEK-PEoEK copolymer, as above detailed, is the only polymeric component in the bonding film. As used herein, the expression "polymeric component" means a compound having repeat units and a molecular weight of at least 2,000 g/mol. In some embodiments, the bonding film includes less than 3 wt. %, 2 wt. %, 1 wt. %, 0.5 wt. % of a polymeric component other than the PEEK-PEoEK copolymer.

In certain embodiments the bonding film comprises at least 90 wt. % of the PEEK-PEoEK copolymer and at least one additive and/or at least one additional polymer component different from the PEEK-PEoEK copolymer. Most preferably the bonding film comprises at least 95 wt. %, preferably at least 98 wt. % of the PEEK-PEoEK copolymer and at least one additive.

The film of the invention may have a thickness from 15 to 800 μm, even from 25 to 600 μm, preferably from 30 to 500 μm, more preferably from 40 to 300 μm, most preferably from 50 to 250 μm.

The film of the invention may be prepared by any conventional method known in the art of polymer processing.

The components of the bonding film will be typically processed in the form of a film by cast extrusion, optionally with mono- or bi-axial orientation. As used herein, the expression "components of the film" includes the PEEK-PEoEK copolymer and optionally: at least one additive, at least one additional polymer component different from the PEEK-PEoEK copolymer, or a combination thereof.

In some embodiments, the method of making the film includes melt compounding a physical mixture of the components of the film. Conventional melt compounding devices, such as co-rotating and counter-rotating extruders, single screw extruders, co-kneaders, disc-pack processors and various other types of extrusion equipment can be used. Preferably, extruders, more preferably twin screw extruders can be used.

In some embodiments, the physical mixture is compounded in an extruder and then chopped into pellets or granules. The granules or pellets can then be further processed to manufacture the inventive film.

Alternatively, the physical mixture is compounded in an extruder and then directly formed into a film. A technique particularly adapted to the manufacture of the inventive bonding films involves extruding the molten composition through a die having elongated shape so as to obtain an extruded tape and casting/calendering said extruded tape so as to obtain a film. The tape can be calendered into a film by passing through appropriate rolls, which can be maintained at appropriate temperatures, and whose speed can be adjusted so as to achieve the required thickness. The thickness of the film is adjusted at the die. The film can be either amorphous or semicrystalline in its finished (extruded) form, depending on the cooling temperatures utilized to solidify the film.

In an advantageous embodiment the film is a monolayer film, i.e. it consists of only one layer comprising a PEEK-PEoEK copolymer.

Method of Making Assemblies

A second object of the invention, is a method of making an assembly using the film according to the first object of the invention. The method comprises the steps of: arranging the film according to the first object of the invention between a first component comprising a polymer (P1) and a second component comprising a polymer (P2); and subjecting the film to a temperature ($T_m^x$), suitable to melt the film but not to melt polymer (P1) and polymer (P2).

Temperature ($T_m^x$) is typically greater than the melting temperature of the bonding film. Temperature ($T_m^x$) may be less than 330° C., preferably less than 320° C., more preferably less than 310° C. Said temperature may be greater than 270° C. Said temperature may be in the range 270° C. to 330° C., preferably in the range 280° C. to 315° C.

Temperature ($T_m^x$) is preferably lower than the melting temperature of polymer (P1) and polymer (P2).

The method preferably comprises the steps of: arranging the film between a first component comprising a polymer (P1) and a second component comprising a polymer (P2); and subjecting the film to a temperature ($T_m^x$) within the range 280° C. to 315° C., suitable to melt the film but not to melt polymer (P1) and polymer (P2).

Preferably, whilst the film and said polymers (P1) and (P2) are being subjected to said temperature ($T_m^x$) the method comprises application of pressure thereby to consolidate the components and produce said assembly. Hence, the method further comprises applying pressure to said first and second component while the film is being subjected to temperature ($T_m^x$).

In the method, cooling of the bonding film after melting is preferably controlled so the PEEK-PEoEK copolymer in the bonding film develops crystallinity (i.e. it is not amorphous). After cooling, the film preferably has a crystallinity of at least 5%, preferably at least 15%, more preferably at least 20%, especially at least 23% measured as described herein.

The expression "first component comprising a polymer (P1)" is used herein to refer to a component having at least one surface, notably the surface in contact with the bonding film, comprising a polymer (P1). First component may consist of said polymer (P1). Alternatively, first component comprises one surface comprising polymer (P1). The surface comprising polymer (P1) typically has a thickness suitable to form a bond with the bonding film. Said thickness may conveniently be equal to or greater than 5 μm.

The expression "second component comprising a polymer (P2)" is used herein to refer to a component having at least one surface, notably the surface in contact with the bonding film, comprising a polymer (P2).

Second component may consist of said polymer (P2). Alternatively, second component comprises one surface comprising polymer (P2). The surface comprising polymer (P2) typically has a thickness suitable to form a bond with the bonding film. Said thickness may conveniently be equal to or greater than 5 μm.

Polymer (P1) and polymer (P2) may be the same or different.

Polymer (P1) and polymer (P2) may independently be selected from the group consisting of crystalline and/or high temperature thermoplastic polymers. Notable non-limiting examples include, but are not limited to, poly(arylether ketones), polyetherimides, polyamideimides, polysulfones, polyethersulfones, polyarylethers, polycarbonates, liquid crystal polymers, polyphenylene sulfides, polyarylenes (polyphenylenes), polyamides, polyphthalamides, polyaromatic esters and blends thereof.

In a preferred embodiment, polymer (P1) and polymer (P2) are independently selected from the group consisting of polyaryletherketones, hereinafter referred to as "PAEK", as well as blends of polyaryletherketones.

Suitable PAEK are those polymers including at least 50 wt. % of recurring units ($R_{PAEK}$) represented by a formula selected from the group consisting of formulae (A) and (K-A) to (K-M) as defined above. In some embodiments the PAEK has at least 60 wt. %, at least 80 wt. %, at least 90 wt. %, at least 95 wt. % or at least 98 wt. % recurring units ($R_{PAEK}$).

The PAEK polymer may be a homopolymer, a random, alternate or block copolymer. When the PAEK polymer is a copolymer, it may contain (i) recurring units ($R_{PAEK}$) of at least two different formulae chosen from formulae (A) and (K-A) to (K-M).

According to some embodiments, the recurring units ($R_{PAEK}$) are selected from the group consisting of units of formulae (J'-A) to (J'-D):

(J'-A)

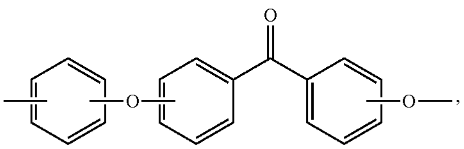

(J'-B)

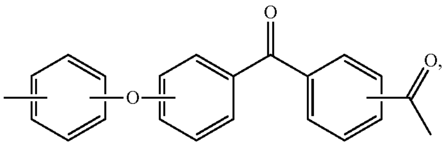

-continued (J′-C)

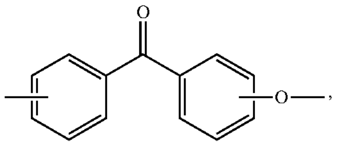

(J′-D)

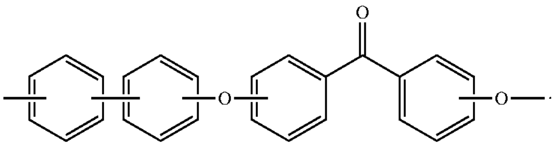

The PAEK polymer may be a polyetheretherketone ("PEEK") polymer. As used herein, the term "PEEK polymer" refers to any polymer in which at least 50 wt. % of the recurring units are recurring units ($R_{PAEK}$) of formula J'-A, in particular recurring units ($R_{PAEK}$) of formula (A-1) as defined above. In some embodiments, at least 75 wt. %, at least 85 wt. %, at least 95 wt. %, or at least 99 wt. % of the recurring units of the PEEK polymer are recurring units of formula J'-A. In some embodiments, 99.99 wt. % of the PEEK polymer are recurring units of formula J'-A, in particular recurring units ($R_{PAEK}$) of formula (A-1).

The PAEK polymer may be a polyetherketoneketone ("PEKK") polymer.

As used herein, the term "PEKK polymer" refers to any polymer comprising recurring units ($R^T$) and recurring units ($R^I$) in a combined amount of at least 50 mol. %, based on the total number of moles in the PEKK polymer, wherein recurring unit ($R^T$) is represented by formula (T):

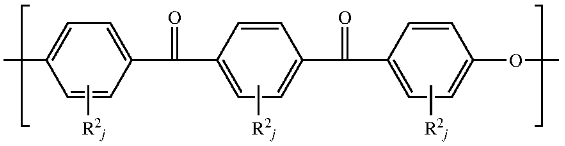

and recurring unit ($R^I$) is represented by formula (I):

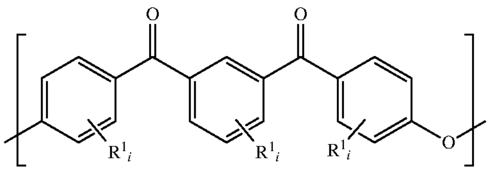

wherein:

in each of formula (T) and formula (I), each $R^1$ and $R^2$, at each instance, is independently selected from the group consisting of an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and each i and j, at each instance, are integers independently selected from 0 to 4.

For the avoidance of doubt, the molar content of recurring units ($R^T$), is defined as:

$$T\text{ (mol. \%)} = \frac{[\text{units }(R^T)]}{[\text{units }(R^T)] + [\text{units }(R^I)]} \times 100,$$

the molar content of recurring units ($R^I$), is defined as:

$$I\text{ (mol. \%)} = \frac{[\text{units }(R^I)]}{[\text{units }(R^T)] + [\text{units }(R^I)]} \times 100,$$

and the T/I ratio is hence defined as:

$$(T/I) = \frac{T}{I}.$$

According to an embodiment, i and j are zero for each $R^1$ and $R^2$ group. In other words, recurring units ($R^T$) and ($R^I$) are both unsubstituted. According to this embodiment, recurring units ($R^T$) and ($R^I$) are respectively represented by formulas (T') and (I'):

(T′)

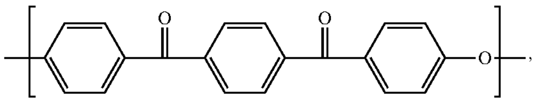

, and (I′)

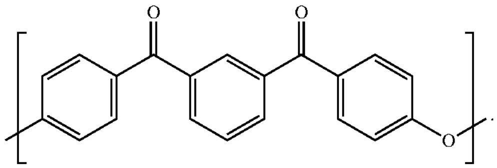

In certain embodiments, polymer (P1) and polymer (P2) are independently selected from PEKK polymer as defined above with a T/I ratio in the range from 55/45 to 85/15, preferably from 57/43 to 80/20, more preferably from 58/42 to 75/25.

In other embodiments polymer (P1) and polymer (P2) may be independently selected from compositions comprising a first and a second PEKK polymer each PEKK polymer characterised by a T/I ratio, wherein the T/I ratio of the first PEKK polymer is different from T/I ratio of the second PEKK polymer, in particular those compositions having a melting temperature of less than or equal to 330° C. In an aspect of said embodiment the first PEKK polymer preferably has a (T/I) ratio of at least 50/50, preferably of at least 54/46, more preferably of at least 56/44; most preferably of at least 57/43 and/or a (T/I) low of at most 64/36, preferably of at most 63/37, more preferably of at most 62/38. The second PEKK polymer preferably has a (T/I) ratio of at least 65/35, preferably of at least 66/34, more preferably of at least 67/33; and/or a (T/I) high of at most 85/15, preferably of at most 83/17, more preferably of at most 82/18.

In a further aspect of said embodiment, the following inequality is satisfied: (molar content of recurring units ($R^T$) in the second PEKK polymer)−(molar content of recurring units ($R^T$) in the first PEKK polymer)≤20 mol. %, preferably ≤17 mol. %, more preferably ≤15 mol. %. Typically, the following inequality is also met: (molar content of recurring units ($R^T$) in the second PEKK polymer)−(molar content of recurring units ($R^T$) in the first PEKK polymer)≥3 mol. %, preferably ≥4 mol. %, more preferably ≥5 mol. %.

In an embodiment of the invention polymer PEKK is a nucleophilic PEKK, which means that polymer PEKK is produced by polycondensation of di-hydroxy and di-fluoro benzoyl-containing aromatic compounds and/or of hydroxyl-fluoro benzoyl-containing aromatic compounds.

In an alternative embodiment, polymer PEKK is an electrophilic PEKK.

In yet other embodiments, the polymer (PAEK) is a poly(ether ketone) [polymer (PEK)]. As used herein, the expression "poly(ether ketone)" and "polymer (PEK)" denotes any polymer of which more than 50% moles of the recurring units ($R_{PAEK}$) are recurring units of formula (K'-C):

(K'-C)

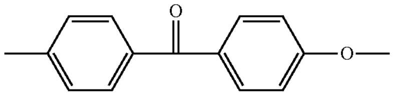

the % moles being based on the total number of moles of recurring units in the polymer (PEK).

According to these embodiments, at least 60% moles, at least 70% mole, at least 80% moles, at least 90% moles, at least 95% moles, at least 99% moles, or even substantially all of the recurring units ($R_{PAEK}$) are recurring units (K'-C). Preferred polymers (PEK) are those wherein substantially all recurring units are units of formula (K'-C), being understood that end-groups, defects and minor amounts of impurities may be present.

In some embodiments, the polymer (PAEK) is a poly (ether diphenyl ether ketone) [polymer (PEDEK)]. As used herein, the expression "poly(ether diphenyl ether ketone)" or "polymer (PEDEK)" denotes any polymer of which more than 50% moles of the recurring units ($R_K$) are recurring units of formula (K'-D):

(K'-D)

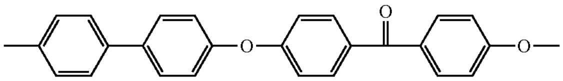

the % moles being based on the total number of moles of recurring units in the polymer (PEDEK).

According to these embodiments, at least 60% moles, at least 70% moles, at least 80% moles, at least 90% moles, at least 95% moles, at least 99% moles, or even substantially all recurring units ($R_K$) are recurring units (K'-D), as above detailed. Preferred polymers (PEDEK) are those wherein substantially all recurring units are units of formula (K'-D), being understood that end-groups, defects and minor amounts of impurities may be present.

In some other embodiments, the polymer (PAEK) is a poly(ether diphenyl ether ketone)-poly(ether ether ketone) copolymer [polymer (PEEK-PEDEK)]. As used herein, the expression "poly(ether diphenyl ether ketone)-poly(ether ether ketone) copolymer" or "polymer (PEEK-PEDEK)" denotes any polymer of which more than 50% moles of the recurring units ($R_K$) are a mixture of recurring units of formula (K'-A) and (K'-D), in the relative molar proportions (K'-A):(K'-D) of 95:5 to 5:95, preferably of 80:20 to 20:80.

In some embodiments polymer (P1) may be part of a first composition which may include polymer (P1) and a filler. Said filler may include a fibrous filler or a non-fibrous filler. Said filler may include both a fibrous filler and a non-fibrous filler.

Additionally, or alternatively, polymer (P2) may be part of a second composition which may include polymer (P2) and a filler. Said filler may include a fibrous filler, or a non-fibrous filler. Said filler may include both a fibrous filler, and a non-fibrous filler.

Suitable fibrous fillers include, for example, carbon fibers, graphite fibers, glass fibers, such as E glass fibers, ceramic fibers such as silicon carbide fibers, synthetic polymer fibers such as aromatic polyamide fibers, polyimide fibers, high-modulus polyethylene (PE) fibers, polyester fibers and poly-benzoxazole fibers such as poly-p-phenylene-benzobisoxazole (PBO) fibers, aramid fibers, boron fibers, basalt fibers, quartz fibers, alumina fibers, zirconia fibers and mixtures thereof. Fibers may be continuous or discontinuous and may be aligned or randomly oriented.

In some embodiments, the fibers include at least one carbon fiber. As used herein, the term "carbon fiber" is intended to include graphitized, partially graphitized, and ungraphitized carbon reinforcing fibers, as well as mixtures thereof. The carbon fibers can be obtained by heat treatment and pyrolysis of different polymer precursors such as, for example, rayon, polyacrylonitrile (PAN), aromatic polyamide or phenolic resin; carbon fibers may also be obtained from pitchy materials. The term "graphite fiber" is intended to denote carbon fibers obtained by high temperature pyrolysis (over 2000° C.) of carbon fibers, wherein the carbon atoms place in a way similar to the graphite structure. The carbon fibers are preferably chosen from the group consisting of PAN-based carbon fibers, pitch based carbon fibers, graphite fibers, and mixtures thereof.

In some embodiments, the fibers include at least one glass fiber. Glass fibers may have a circular cross-section or a non-circular cross-section (such as an oval or rectangular cross-section). When the glass fibers used have a circular cross-section, they preferably have an average glass fiber diameter of 3 to 30 μm, with a particularly preferred average glass fiber diameter of 5 to 12 μm. Different types of glass fibers with a circular cross-section are available on the market depending on the type of the glass they are made of. One may notably cite glass fibers made from E- or S-glass. In some embodiments, the glass fiber is standard E-glass material with a non-circular cross section. In some embodiments, the polymer composition includes S glass fibers with a circular cross-section.

In an embodiment the composite material of the invention comprises continuous fibers. As referred to herein, "continuous fibers" refer to fibers having a length of greater than or equal to 3 mm, more typically greater than or equal to 10 mm and an aspect ratio of greater than or equal to 500, more typically greater than or equal to 5000.

In an embodiment of the invention the first component is a composite material comprising one or more layers comprising fibers and polymer (P1). Polymer (P1) is either impregnated, coated or laminated onto the fibers.

In further embodiment of the invention the second component is a composite material comprising one or more layers comprising fibers and polymer (P2). Polymer (P2) is either impregnated, coated or laminated onto the fibers.

A further object of the invention is an assembly comprising a first component comprising polymer (P1), a second component comprising polymer (P2) and the film of the invention positioned between said first and second component and bonded to said first and second component.

The term "bonded" herein is meant that the materials are attached to one another, preferably permanently.

The assembly may be a component or parts of a component for applications in the aerospace and automotive industries. For example, components comprising or consisting of the assembly of the present invention can include, but are not limited to, brackets, clips, stiffeners and other similar type parts.

It will be appreciated that any description, even though described in relation to a specific embodiment, is applicable to and interchangeable with other embodiments of the present disclosure.

The invention will be herein after illustrated in greater detail in the following section by means of non-limiting examples.

Should the disclosure of any patents, patent applications, and publications which are incorporated herein by reference conflict with the description of the present application to the extent that it may render a term unclear, the present description shall take precedence.

EXAMPLES

Raw Materials 1,2-dichlorobenzene, terephthaloyl chloride, isophthaloyl chloride, 3,5-dichlorobenzoylchloride, aluminum chloride ($AlCl_3$), methanol were purchased from Sigma Aldrich.

1,4-Bis(4-phenoxybenzoyl)benzene was prepared according to IN patent 193687 (filed on Jun. 21, 1999 and incorporated herein by reference).

Hydroquinone, photo grade, was procured from Eastman, USA. It contained 0.38 wt % moisture, which amount was used to adapt the charge weights. All weights indicated include moisture.

Resorcinol, ACS reagent grade, was procured from Aldrich, USA 4,4'-Biphenol, polymer grade, was procured from SI, USA.

Pyrocatechol, flakes, was procured from Solvay USA. Its purity was 99.85% by GC. It contained 680 ppm moisture, which amount was used to adapt the charge weights. All weights indicated include moisture.

4,4'-Difluorobenzophenone, polymer grade (99.8%+), was procured from Malwa, India Diphenyl sulfone (polymer grade) was procured from Proviron (99.8% pure).

Sodium carbonate, light soda ash, was procured from Solvay S.A., France.

Potassium carbonate with a $d_{90}$<45 μm was procured from Armand products.

Lithium chloride (anhydrous grade) was procured from Acros.

1,4-bis(4'-fluorobenzoyl)benzene (1,4-DFDK) and 1,3 bis (4'-fluorobenzoyl)benzene (1,3-DFDK) were prepared by Friedel-Crafts acylation of fluorobenzene according to Example 1 of U.S. Pat. No. 5,300,693 to Gilb et al. (incorporated herein by reference in its entirety). Some of the 1,4-DFDK was purified as described in U.S. Pat. No. 5,300,693 by recrystallization in chlorobenzene, and some of the 1,4-DFDK was purified by recrystallization in DMSO/ethanol. The 1,4-DFDK purified by recrystallization in DMSO/ethanol was used as the 1,4-DFDK in the polymerization reactions to make PEKK described below, while 1,4-DFDK recrystallized in chlorobenzene was used as precursor for 1,4-bis(4'-hydroxybenzoyl)benzene (1,4-BHBB).

1,4-BHBB and 1,3-bis(4'-hydroxybenzoyl)benzene (1,3-BHBB) were produced by hydrolysis of the 1,4-DFDK, and 1,3-DFDK, respectively, following the procedure described in Example 1 of U.S. Pat. No. 5,250,738 to Hackenbruch et al. (incorporated herein by reference in its entirety). They were purified by recrystallization in DMF/ethanol.

Determination of the Melting Temperature ($T_m$), Crystallization Temperature (Tc) and Heat of Fusion The melting temperature $T_m$ was determined as the peak temperature of the melting endotherm on the $2^{nd}$ heat scan in differential scanning calorimeter (DSC) according to ASTM D3418-03, E1356-03, E793-06, E794-06. Details of the procedure as used in this invention are as follows: a TA Instruments DSC Q20 was used with nitrogen as carrier gas (99.998% purity, 50 mL/min). Temperature and heat flow calibrations were done using indium. Sample size was 5 to 7 mg. The weight was recorded ±0.01 mg. The heat cycles were:

- $1^{st}$ heat cycle: 30.00° C. to 400.00° C. at 10.00° C./min, isothermal at 400.00° C. for 1 min;
- $1^{st}$ cool cycle: 400.00° C. to 30.00° C. at 10.00° C./min, isothermal for 1 min;
- $2^{nd}$ heat cycle: 30.00° C. to 400.00° C. at 10.00° C./min, isothermal at 400.00° C. for 1 min.

The melting temperature $T_m$ was determined as the peak temperature of the melting endotherm on the $2^{nd}$ heat scan. The enthalpy of fusion was determined on the $2^{nd}$ heat scan. The melting of the composition was taken as the area over a linear baseline drawn from 220° C. to a temperature above the last endotherm. When assessing the crystallinity of the film in the bonded structure (part), the heat of fusion was determined on the $1^{st}$ heat scan.

The crystallization temperature $T_c$ was determined as the peak temperature of the crystallization exotherm on the 1st cool scan.

Determination of the Melt Viscosity

The melt viscosity was measured using a capillary rheometer according to ASTM D3835. Readings were taken after 10-minute (reported in Table 2) and 40-minute dwell time at 380 or 410° C. (as indicated) and a shear rate of 46.3 $s^{-1}$ using a die with the following characteristics: diameter=1.016 mm, length=20.32 mm, cone angle=120°. The melt stability VR40 is measured by the ratio of the viscosity at 40 minutes over the viscosity at 10 minutes.

Determination of Tensile Properties

A 762 mm×762 mm×3.2 mm plaque was prepared from the polymer by compression molding of 30 g of polymer under the following conditions: preheat at $T_1$, $T_1$/20 minutes, 2000 kg-f $T_1$/2 minutes, 2700 kg-f cool down to 30° C. over 40 minutes, 2000 kg-f $T_1$ values used for the polymers are indicated in the results table. The plaques were then annealed at 200° C. for 3 hours.

The 762 mm×762 mm×3.2 mm compression molded plaques were machined into Type V ASTM tensile specimens and these specimens of the various polymer compositions were subjected to tensile testing according to ASTM method D638 at 0.05 inch/minute (0.127 cm/min) room temperature (i.e. 23° C.) on 3 specimens. The average of the 3 specimens is presented with the standard deviation in brackets.

Synthesis Examples

Comparative Example 1: PEKK with 60/40 T/I Ratio

In a 500 mL 4-neck reaction flask fitted with a stirrer, a N2 inlet tube, a Claisen adapter with a thermocouple plunging in the reaction medium, and a Dean-Stark trap with a condenser and a dry ice trap were introduced 112.50 g of diphenyl sulfone, 33.390 g of 1,3-BHBB, 6.372 g of 1,4-BHBB and 41.051 g of 1,4-DFDK. The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 270° C. At 270° C., 13.725 g of $Na_2CO_3$ and 0.086 g of $K_2CO_3$ was added via a powder dispenser to the reaction mixture over 60 minutes. At the end of the addition, the reaction mixture was heated to 320° C. at 1° C./minute. After 2 minutes at 320° C., 1.207 g of 1,4-DFDK were added to the reaction mixture while keeping a nitrogen purge on the reactor. After 5 minutes, 0.529 g of lithium chloride were added to the reaction mixture. 10 minutes later, another 0.503 g of 1,4-DFDK were added to the reactor and the reaction mixture was kept at temperature for 15 minutes. Another charge of 25 g of diphenyl sulfone was added to the reaction mixture, which was kept under agitation for 15 minutes. The reactor content was then poured from the reactor into a stainless steel pan and cooled. The solid was broken up and ground in an attrition mill through a 2 mm screen. Diphenyl sulfone and salts were extracted from the mixture with acetone and water at pH between 1 and 12. 0.67 g of $NaH_2PO_4 \cdot 2H_2O$ and 0.62 g of $Na_2HPO_4$ were dissolved in 1200 ml deionized water for the last wash. The powder was then removed from the reactor and dried at 120° C. under vacuum for 12 hours yielding 72 g of a yellow powder. The properties of the final polymer are detailed in Table 2.

Comparative Example 2: Preparation of PEEK-PEDEK 75/25 Copolymer

In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 128.21 g of diphenyl sulfone, 20.297 g of hydroquinone, 11.411 g of 4,4'-biphenol and 54.377 g of 4,4'-difluorobenzophenone. The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 150° C. At 150° C., a mixture of 26.955 g of $Na_2CO_3$ and 0.169 g of $K_2CO_3$ was added via a powder dispenser to the reaction mixture over 30 minutes. At the end of the addition, the reaction mixture was heated to 320° C. at 1° C./minute. After 13 minutes at 320° C., 3.742 g of 4,4'-difluorobenzophenone were added to the reaction mixture while keeping a nitrogen purge on the reactor. After 5 minutes, 1.039 g of lithium chloride were added to the reaction mixture. 10 minutes later, another 2.138 g of 4,4'-difluorobenzophenone were added to the reactor and the reaction mixture was kept at temperature for 15 minutes.

The reactor content was then poured from the reactor into a SS pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 74 g of a white powder.

The melt viscosity measured by capillary rheology at 410° C., 46 $s^{-1}$ was 0.28 KN-s/$m^2$.

The properties of the final polymer are detailed in Table 2.

Comparative Example 3: Preparation of PEEK-PEmEK 70/30 Copolymer

In a 1000 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 330.00 g of diphenyl sulfone, 37.949 g of hydroquinone, 16.234 g of resorcinol and 109.875 g of 4,4'-difluorobenzophenone. The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 150° C. At 150° C., a mixture of 54.099 g of $Na_2CO_3$ and 0.170 g of $K_2CO_3$ was added via a powder dispenser to the reaction mixture over 30 minutes. At the end of the addition, the reaction mixture was heated to 300° C. at 1° C./minute. After 57 minutes at 300° C., 17.135 g of 4,4'-difluorobenzophenone were added to the reaction mixture while keeping a nitrogen purge on the reactor. After 5 minutes, 2.081 g of lithium chloride were added to the reaction mixture. 10 minutes later, another 4.284 g of 4,4'-difluorobenzophenone were added to the reactor and the reaction mixture was kept at temperature for 15 minutes.

The reactor content was then poured from the reactor into a SS pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 100° C. under vacuum for 12 hours yielding 125 g of a light brown powder.

The melt viscosity measured by capillary rheolology at 410° C., 46 $s^{-1}$ was 0.70 kN-s/$m^2$. The properties of the final polymer are detailed in Table 2.

Example 4: Preparation of PEEK-PEoEK 80/20 Copolymer

In a 1000 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 343.63 g of diphenyl sulfone, 61.852 g of hydroquinone, 15.426 g of pyrocatechol and 154.573 g of 4,4'-difluorobenzophenone. The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 150° C. At 150° C., a mixture of 76.938 g of $Na_2CO_3$ and 0.484 g of $K_2CO_3$ was added via a powder dispenser to the reaction mixture over 30 minutes. At the end of the addition, the reaction mixture was heated to 320° C. at 1° C./minute. After 1 minute at 320° C., the reaction was terminated in 3 stages: 18.329 g of 4,4'-difluorobenzophenone were added to the reaction mixture while keeping a nitrogen purge on the reactor. After 5 minutes, 2.338 g of lithium chloride were added to the reaction mixture. 10 minutes later, another 6.110 g of 4,4'-difluorobenzophenone were added to the reactor and the reaction mixture was kept at temperature for 15 minutes.

The reactor content was then poured from the reactor into a SS pan and cooled. The solid was broken up and ground in an attrition mill through a 2 mm screen. Diphenyl sulfone and salts were extracted from the mixture with acetone and water at pH between 1 and 12. The powder was then dried at 120° C. under vacuum for 12 hours yielding 174 g of a white powder.

The melt viscosity measured by capillary rheology at 410° C., 46 $s^{-1}$ was 1.50 $KN\text{-}s/m^2$. The properties of the polymer are disclosed in Table 2 below.

Examples 5-7: Preparation of PEEK-PEoEK 75/25 and 70/30 Copolymers

The same procedure as Example 4 was followed but with the following amounts of reagents shown in Table 1. The properties of the resulting polymer are in Table 2.

TABLE 1

Reagents for the preparation of Examples 5-7 reagents

| Reagent | Units | Ex. 5 | Ex. 6 | Ex. 7 |
|---|---|---|---|---|
| PEEK/PEoEK | | 75/25 | 75/25 | 70/30 |
| Diphenyl sulfone | g | 340.54 | 343.63 | 343.63 |
| Hydroquinone | g | 57.500 | 57.987 | 54.121 |
| pyrocatechol | g | 19.109 | 19.282 | 23.139 |
| 4,4'-difluorobenzophenone | g | 153.181 | 154.573 | 153.351 |
| $Na_2CO_3$ | g | 76.245 | 76.938 | 76.938 |
| $K_2CO_3$ | g | 0.479 | 0.484 | 0.484 |
| Time at 320° C. | minutes | 33 | 16 | 73 |
| 4,4'-difluorobenzophenone in first termination | g | 10.596 | 18.329 | 18.329 |
| Lithium chloride in second termination | g | 2.941 | 2.388 | 2.388 |
| 4,4'-difluorobenzophenone in third termination | g | 6.055 | 343.63 | 6.110 |
| Polymer weight | g | 185 | 188 | 188 |
| $Na_2HPO_4$ | g | 1.86 | 1.86 | 1.86 |

Table 2 presents the properties of the samples prepared according to Examples 1-7

TABLE 2

| Property | Units | CE1 | CE2 | CE3 | E4 | E5 | E6 | E7 |
|---|---|---|---|---|---|---|---|---|
| PAEK unit | | PEKK | PEDEK | PEmEK | PEoEK | PEoEK | PEoEK | PEoEK |
| PEEK/PAEK ratio (mol/mol) | | 58/42 | 75/25 | 70/30 | 80/20 | 75/25 | 75/25 | 70/30 |
| MV (410° C., 46 $s^{-1}$) | kN-$s/m^2$ | 0.58 | 0.28 | 0.70 | 0.33 | 1.50 | 0.32 | 1.41 |
| Tg | ° C. | 158 | 151 | 135 | 143 | 145 | 143 | 144 |
| Tm | ° C. | 303 | 307 | 293 | 309 | 294 | 292 | 283 |
| Tc | ° C. | 214 | 255 | 221 | 261 | 226 | 200 | 195 |
| Heat of fusion | J/g | 8 | 39 | 41 | 41 | 36 | 14 | 16 |
| $T_1$ molding | ° C. | 343 | 343 | | 368 | | 343 | 343 |
| Tensile strength at yield or at break | MPa | 93 | 79 @break | N/A | 97 | N/A | 95 | 95 |
| Tensile (Young) modulus | GPa | 3.3 | 3.6 | N/A | 4.1 | N/A | 3.9 | 3.4 |

The data presented in Table 2 shows that PEEK-PEoEK copolymers are characterised by a generally low $T_m$ with the following advantages over the known PAEKs:

increased crystallinity over PEKK for the same $T_m$ as shown by value of heat of fusion (CE1 vs E4);

higher Tg than PEEK-PEmEK, hence higher continuous use temperature;

improved mechanical properties over PEEK-PEDEK for the same $T_m$ (CE2 vs E4)

the possibility to reach lower $T_m$ than with PEEK-PEDEK ($T_m$<295° C.).

Example 10-11—General Procedure for the Preparation of Bonding Films from the Polymers of Example 5 and CE 3

The polymer, in coarse powder form, was converted to pellets by melt compounding using a 26 mm Coperion® (model ZSK-26) co-rotating partially intermeshing twin screw extruder having an L/D ratio of 48:1. The powder was fed gravimetrically at a rate of 37 lbs/hr (16.8 kg/hr) into the feed hopper at barrel section 1 of the extruder. The extruder had 12 barrel sections with barrel sections 2 through 12, as well as the die, being heated with a temperature profile setting of 350° C. throughout. The melt temperature for the extrudate was measured by a handheld pyrometer as it exited the die.

The extrudate melt temperature was approximately 380° C. throughout the compounding run. The screw speed was set at 200 rpm, and, the resulting torque reading for the extruder was at approximately 50% throughout the production run. Vacuum venting with a vacuum level 26 in Hg was applied at barrel section 10 during compounding to strip off moisture and any possible residual volatiles from the compound. The extrudate from the run was stranded and cooled in a water trough and then pelletized into pellets approximately 2.7 mm in diameter and 3.0 mm in length.

The compounded pellets were processed into film having a nominal thickness of 140 microns and a width of 8.5 to 9 cm using melt extrusion on a single screw extruder. An OCS (Optical Control Systems, GmbH) extruder was used for this purpose. The extruder had a single stage non-vented screw with a diameter of 20 mm and an L/D ratio of 30. It was equipped with a film die 125 mm wide having a 0.5 mm gap thickness. The extruder barrel had four heated sections which were operated from rear to front at temperature settings of approximately: 335, 360, 360 and 370° C., respectively. The film die was set at a temperature of 390° C. Before extrusion into film, the pellets were dried overnight (about 16 hours) in a desiccated air convection oven set at 150° C. The blend was extruded using a screw speed of 28 rpm and a throughput rate of about 4 lb/hr (1.8 kg/hr). The film was formed and drawn down on two chill rolls, set at 140 and 145° C., for the first (top) and second (bottom) roll, respectively.

Example 11: Preparation of Assemblies and Fracture Toughness Tests

Fracture toughness (G1c) laminates (305 mm×305 mm size) whereby the layer in the crack plane is the fusion bonding film that is fused to the surface of the fiber reinforced composite substrate were made as follows. APC (polymer per example 8)/AS4D unitape with a nominal fiber areal weight=145 gsm and resin content of 34 wt. % was cut and stacked to make a 16 ply quasi-isotropic orientation (+45°/0°/−45°/90° 02 s lay-up. On top of that lay-up stack, 1 ply of style 108 glass fabric was placed covering the entire surface followed by placing a 280 mm×305 mm×0.125 mm film of Example 10 with three of the edges aligned with the edges of the lay-up. The other edge had a 305 mm×25 mm×0.05 mm thick release coated Kapton film that was the crack starter once the panel was consolidated. The remainder of the lay-up was to reverse the order of the material placed starting with style 108 fiberglass fabric followed by 16 ply quasi-isotropic.

The lay-up was then placed on a flat steel tool and vacuum bagged (710-730 mm Hg vacuum) to be processed in a high temperature autoclave. The autoclave cycle was a straight temperature ramp to 375° C. at which point 6.7 bars of pressure was applied and held for 15 minutes before cooling the lay-up down while under 6.7 bar (670 kPa) pressure and 711 mm Hg. The pressure was released at 93° C. and cooled down to room temperature before removing from the autoclave. The resulting panels were measured for thickness and then machined into 1"×12" (2.5 cm×30.5 cm) test coupons to conduct G1c fracture toughness measurements.

TABLE 3

G1c results at RTA

| Example | Lay-up | G1c (J/m$^2$) |
|---|---|---|
| Ex 5 | [45/90/−45/0]2s/108glass/PEEK-PEoEK/108 glass/[45/90/−45/0]2s | 1245 |
| CE3 | [45/90/−45/0]2s/108glass/PEEK-PEmEK/108 glass/[45/90/−45/0]2s | 355 |

The data shows that the use of a bonding film according to the invention (Example 5) provided an improved binding of laminates as demonstrated by a high value fracture toughness strength.

The invention claimed is:

1. An assembly comprising a first component comprising a polymer (P1), a second component comprising a polymer (P2) and a film comprising at least one PEEK-PEoEK copolymer, the PEEK-PEoEK copolymer comprising at least 50 mol. %, collectively, of repeat units ($R_{PEEK}$) and repeat units ($R_{PEoEK}$), relative to a total number of moles of repeat units in the PEEK-PEoEK copolymer, wherein:

repeat units ($R_{PEEK}$) are repeat units of formula:

(A)

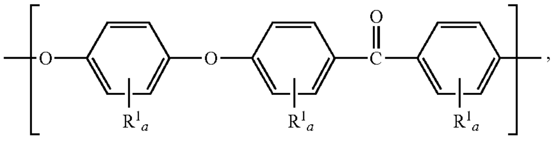

and repeat units ($R_{PEoEK}$) are repeat units of formula:

(B)

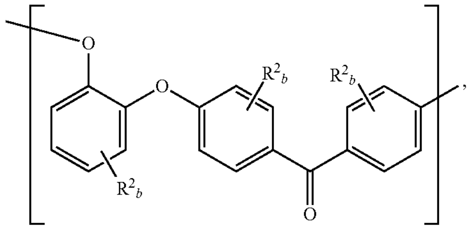

where each $R^1$ and $R^2$, equal to or different from each other, is at each occurrence independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine, and quaternary ammonium;

each a and b is independently selected from integers ranging from 0 to 4;

the PEEK-PEoEK copolymer comprises the repeat units ($R_{PEEK}$) and ($R_{PEoEK}$) in a molar ratio ($R_{PEEK}$)/($R_{PEoEK}$) ranging from 95/5 to 5/95; and said film being positioned between and bonded to said first and second components; and wherein the film has a thickness of from 15 to 800 μm.

2. The assembly of claim 1, wherein the repeat units ($R_{PEEK}$) are repeat units of formula:

(A-1)

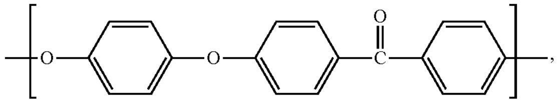

and/or the repeat units ($R_{PEoEK}$) are repeat units of formula:

(B-1)

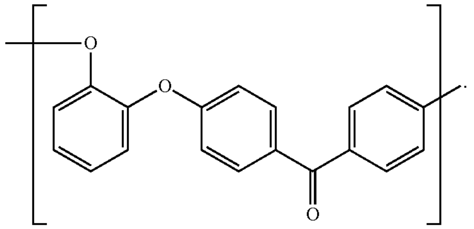

3. The assembly of claim 1 wherein the PEEK-PEoEK copolymer has a molar ratio $(R_{PEEK})/(R_{PEEK})$ in the range from 90/10 to 55/45.

4. The assembly of claim 1 wherein the PEEK-PEoEK copolymer has a melting temperature ($T_m$) of less than or equal to 320° C., as measured by differential scanning calorimetry (DSC) according to ASTM D3418-03, E1356-03, E794-06.

5. The assembly of claim 1 wherein the PEEK-PEoEK copolymer has a solubility of below 0.2% wt in N-methylpyrrolidone (NMP), N,N-dimethylacetamide (DMAc) and N,N-dimethylformamide (DMF), when determined at a temperature of 150° C. or less.

6. The assembly of claim 1, wherein polymer (P1) and polymer (P2) are independently selected from the group consisting of polyaryletherketones, polyamides, polyetherimides, polyamideimides, polysulfones, polyethersulfones, polyarylethers, polycarbonates, liquid crystal polymers, polyphenylene sulfides, polyarylenes (polyphenylenes), polyphthalamides, polyaromatic esters, and blends thereof.

7. The assembly of claim 1, wherein polymer (P1) and polymer (P2) are independently selected from the group consisting of polyaryletherketones, polyetherimides, polyamideimides, polysulfones, polyethersulfones, polyphenylene sulfides, polyphthalamides, and blends thereof.

8. The assembly of claim 1 wherein polymer (P1) and polymer (P2) are independently selected from PEKK polymers with a T/I ratio in a range from 55/45 to 85/15.

9. The assembly of claim 1 wherein the first component is a composite material comprising one or more layers comprising fibers and polymer (P1) and/or the second component is a composite material comprising one or more layers comprising fibers and polymer (P2).

10. The assembly of claim 9 wherein the fibers are carbon or glass fibers.

11. A method of making the assembly of claim 1 which comprises steps of: arranging the film between the first component comprising a polymer (P1) and the second component comprising a polymer (P2); and subjecting the film to a temperature ($T_m^x$), wherein the temperature ($T_m^x$) is suitable to melt the film but not to melt polymer (P1) and polymer (P2).

12. The method of claim 11 wherein temperature ($T_m^x$) is greater than the melting temperature of the film and lower than the melting temperature of polymer (P1) and polymer (P2).

13. The method of claim 11 which further comprises the steps of: arranging the film between the first component comprising a polymer (P1) and the second component comprising a polymer (P2); and subjecting the film to a temperature ($T_m^x$) within the range 280° C. to 315° C.

14. The method of claim 11 wherein, whilst the film is being subjected to said temperature ($T_m^x$), pressure is applied to consolidate the components.

15. An assembly comprising a first component comprising a polymer (P1), a second component comprising a polymer (P2) and a film comprising at least one PEEK-PEOEK copolymer, the PEEK-PEoEK copolymer comprising at least 50 mol. %, collectively, of repeat units ($R_{PEEK}$) and repeat units ($R_{PEoEK}$), relative to a total number of moles of repeat units in the PEEK-PEoEK copolymer, wherein:

repeat units ($R_{PEEK}$) are repeat units of formula:

(A)

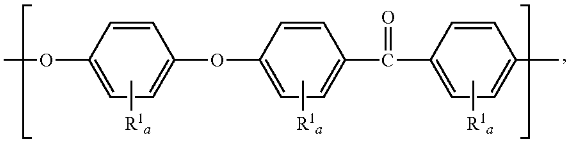

repeat units ($R_{PEoEK}$) are repeat units of formula:

(B)

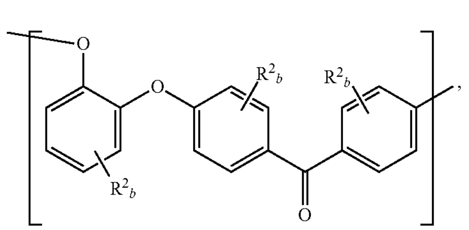

where each $R^1$ and $R^2$, equal to or different from each other, is at each occurrence independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine, and quaternary ammonium;

each a and b is independently selected from integers ranging from 0 to 4;

the PEEK-PEoEK copolymer comprises the repeat units ($R_{PEEK}$) and ($R_{PEoEK}$) in a molar ratio $(R_{PEEK})/(R_{PEoEK})$ ranging from 95/5 to 5/95; and said film being positioned between and bonded to said first and second components;

wherein the first component is a composite material comprising one or more layers comprising fibers and polymer (P1) and/or the second component is a composite material comprising one or more layers comprising fibers and polymer (P2), and wherein the fibers are carbon or glass fibers.

* * * * *